(12) United States Patent
Davey

(10) Patent No.: US 6,626,027 B1
(45) Date of Patent: Sep. 30, 2003

(54) METHOD AND APPARATUS FOR DETECTING A GAS LEAK USING NUCLEAR MAGNETIC RESONANCE

(75) Inventor: Peter Davey, Oxford (GB)

(73) Assignee: Intertech Development Company, Skokie, IL (US)

( * ) Notice: Subject to any disclaimer, the term of this patent is extended or adjusted under 35 U.S.C. 154(b) by 0 days.

(21) Appl. No.: 09/879,842

(22) Filed: Jun. 12, 2001

(51) Int. Cl.⁷ .............................................. G01M 3/04
(52) U.S. Cl. ........................................ 73/40.7; 73/49.2
(58) Field of Search ................... 73/49.2, 40.7

(56) References Cited

U.S. PATENT DOCUMENTS

| | | | |
|---|---|---|---|
| 4,586,511 A | 5/1986 | Clark, Jr. .................. 128/653 |
| 4,636,475 A | * 1/1987 | Price et al. ................. 73/49.2 |
| 4,785,666 A | * 11/1988 | Bergquist .................... 62/55.5 |
| 4,830,192 A | * 5/1989 | Plester et al. ................ 209/3.1 |
| 5,107,697 A | * 4/1992 | Tallon et al. ................ 73/40.7 |
| 5,545,396 A | 8/1996 | Albert et al. ................. 424/93 |
| 5,785,953 A | 7/1998 | Albert et al. ................. 424/93 |
| 5,789,921 A | 8/1998 | Albert et al. ............... 324/300 |
| 5,796,252 A | 8/1998 | Kleinberg et al. .......... 324/303 |
| 5,963,336 A | 10/1999 | McAndrew et al. ........ 356/437 |
| 6,050,133 A | * 4/2000 | Achter et al. ................ 73/49.3 |
| 6,119,507 A | 9/2000 | Flosbach et al. ............... 73/40 |
| 6,314,794 B1 | * 11/2001 | Seigeot ....................... 73/40.7 |

OTHER PUBLICATIONS

Skoog, Douglas E. "Principles of Instrumental Analysis", 3rd edition, Saunders College Publishing, 1984, pp. 408–416.*

Nishikawa et al. "On The Helium Gas Leak Test", *Hitachi Zosen Tech. Rev.*, 36, No. 4 (1975) pp. 90–94 (Abstract).

Robert D. Black et al., "in Vivo He–3 MR Images of Guinea Pig Lungs", *Technical Developments and* James *Instrumentation*, 199 (1996) pp. 867–870.

R. MacFall et al., "Human Lung Air Spaces: Potential for MR Imaging with Hyperpolarized He–3", *Technical Developments and Instrumentation*, 200 (1996) pp. 552–558.

Thad G. Walker et al., "Spin–exchange optical pumping of noble–gas nuclei", *Review of Modern Physics*, 69–2 (1997) pp. 629–642.

Kirsch Le et al., "Pharmaceutical Container/Closure Integrity. I: Mass–Spectrometry–Based HeliumLeak Rate Detection for Rubber–Stoppered Glass Vials", *PDA J. Pharm Sci Technol*, 51 (1997) pp. 187–194 (Abstract).

Jaques Hoffman, "Computerized Mass Flow Dry Air Leak Testing Speeds Test Cycles", *Back to Basics*, (Jun. 1997).

"Helium Leak Detection", *Alcatel Vacuum Technology, Inc. Homepage*, (2000) asm. 1808, 1201211–1201216.

"Leak Rate Technical Reference Guide", *LACO Technologies*.

Gerald L. Anderson, "Excerpts from the Leak Testing Primer", *American Gas &Chemical Co, Ltd.* (2000).

Gerald L. Anderson, "Leak Testing Large Containers", *American Gas &Chemical Co, Ltd.* (2000).

\* cited by examiner

*Primary Examiner*—Edward Lefkowitz
*Assistant Examiner*—Michael Cygan
(74) *Attorney, Agent, or Firm*—Fitch, Even, Tabin & Flannery

(57) ABSTRACT

A method and apparatus for measuring a leakage rate for an article using nuclear magnetic resonance includes a source of hyper-polarized gas that is detectable using nuclear magnetic resonance. The hyper-polarized gas is used as a tracer gas. The method for measuring a leakage rate involves injecting hyper-polarized gas into a device under test and determining the leakage rate from the nuclear magnetic resonance measurements of the quantity of gas which passes through the article into a leak test chamber over a given test time period. The hyper-polarized gas is He-3, which is polarized by combining it with an optically pumped vapor of rubidium atoms.

6 Claims, 2 Drawing Sheets

METHOD AND APPARATUS FOR DETECTING A GAS LEAK USING NUCLEAR MAGNETIC RESONANCE

BACKGROUND OF THE INVENTION

The invention relates in general to a method and apparatus for detecting very small gas leaks and in particular to a method and apparatus for detecting leakage using nuclear magnetic resonance.

A leak results from a hole or porosity in an enclosure or, more generally, an article of manufacture capable of passing material from the higher pressure side to the lower pressure side. A leak path normally has an involved geometry sometimes extending a relatively long distance from beginning to end. Leakage refers to the flow of a material through a leak path without regard to the physical size or shape of the hole. Leakage typically occurs as a result of a pressure differential across the leak path. However, capillary effects can also be the cause of leakage.

Nothing can ever be completely free of leakage. Every container or article always has some leakage, even if those leaks are so minute that it would take hundreds of years for a cubic centimeter of gas to escape. The high cost of finding small leaks must be balanced against the functioning of the article over its useful life.

Because the cause of a leak usually cannot be seen or physically measured, the quantity often used to describe the leak is the leakage rate. The concept of an object being leakage tight is meaningless except in relation to the substance which is to be contained under operating conditions and the objectives with respect to safety, contamination and reliability. A measure of leakage rate must have dimensions equivalent to pressure, temperature, time, and volume. Leakage tight or acceptable leakage rate is the practical leakage which is acceptable under normal operating circumstances.

Manufacturing of articles which are meant to hold liquids or gases, i.e., serve some sort of barrier function, requires that the article be tested for a leakage in order to practice quality assurance. The demands of such quality assurance testing vary greatly depending on the nature of the article and its intended use.

In a high volume production of articles having a stringent permissible leakage rate the cost associated with high accuracy leak detecting is weighed against the competing cost of time taken to perform the test. That is, it is desired to test each article at the accuracy required by manufacturing specifications but to do so at a minimal cost of materials and time. Typical products for which economic leakage detection is a significant issue are vacuum chambers, TV and other cathode ray tubes, hermetically-sealed electronic components, pressure vessels, aerosol containers, vacuum thermal isolation, semiconductor manufacturing equipment and automotive gas tanks.

There are many different methods of leak testing some of which allow a quantitative determination of leakage and others give a qualitative leakage determination or are otherwise highly dependent on subjective determinations. Qualitative leak tests include bubble testing. A soap solution is painted over the surface of a pressurized vessel or the vessel is immersed in a tank of liquid. In soap bubble testing the formation of bubbles indicates the area of the article which is leaking. The leakage rate, however, is difficult to estimate and the article under test must be cleaned after the test. Hydrostatic testing involves filling the article under test with water at high pressure and looking for moisture formation due to leakage. This test requires a long test cycle since there is a significant cleanup and the test itself is relatively time consuming.

Some of the above tests can be evaluated to give a semi-quantitative result but require the operator to apply subjective judgements to do so.

There are also a number of fully quantitative methods of leak detection in use. It is convenient to rank these according to the minimum detectable leakage rate achieved with each technique. In the pressure-drop technique, the test system pressurizes the article with dry air and uses a suitable pressure sensor to measure the pressure change due to subsequent leakage. A refinement is to simultaneously pressurize two articles, the one to be tested and the other an identical article known to be leak-free. Subsequent pressure difference between the two parts allows a leakage rate to be measured which is substantially independent of temperature changes caused by the pressurization process itself.

The mass-flow technique is generally similar to pressure-drop, but measures differential mass flow between the two articles. It has advantages in higher speed, and in offering an immediate measurement of leakage rate independent of test pressure. The mass flow technique also enables the use of further refinements to minimize errors introduced by heat exchange between the walls of the article and the air within, particularly when the temperature of the walls is changing significantly during the period of test. The effectiveness of such refinements varies, however, with the size of the article, the time available for testing, the test pressure, and the rate of change of temperature in the article. In general, neither of the above techniques is likely to give accurate measurements of leakage rates much smaller than $10^{-5}$ sccs (standard cc. per second).

For smaller leakage rates to be detectable, a tracer-gas technique must be used. The leak test system is arranged to produce a different concentration of the chosen tracer-gas between the interior and the exterior of the article. The essential difference form the techniques described above, is that pressure (or vacuum) is used merely to produce a pressure-gradient tending to drive molecules through the leak, not as a measurement means. A detector, chosen to be sensitive to the tracer gas only, is used to measure the passage of molecules of the tracer gas through any leak. In a typical system, a tracer gas such as sulfur hexafluoride, hydrogen, or helium is diluted with dry air (for economy) and injected to create an over-pressure inside the article. The system includes means outside the article for collecting any of the gas mixture emerging through a leak, and passing it to the detector. Provided the detector is sufficiently selective, the tracer gas technique is completely independent of changes of temperature and/or pressure in the part or article under test or the collection system.

Various means are used to make a detector sufficiently selective for the chosen tracer. For example, a mass spectrometer can be set to match the charge/mass ratio for the nuclei of hydrogen or helium. This arrangement is highly selective and leakage rates down to $10^{-11}$ sccs. are measurable. A significant drawback however is that the tracer molecules must first be ionized, then detected. This normally requires high vacuum conditions, achieving which generally introduces severe time and cost penalties in production-line leak-testing. Care is also required to ensure low background concentrations of tracer in the environment, and rapid clean-up after the testing of a previous article having a gross leak.

Other known operational goals include minimizing the costs of: test setup; consumables used during testing; and cleanup. Where a leak detection system uses tracer gases it is advantageous if the gases are non-toxic, non-flammable and as inexpensive as practical.

SUMMARY OF THE INVENTION

An apparatus and method embodying the present invention provide for measuring a leakage rate in which the nuclei of tracer gas are detected by means of their overall spin, i.e. nuclear magnetic moment. This affords even higher selectively than a mass spectrometer, since only a small minority of all possible gases have nuclei with overall spin. There is no need to ionize the gas, nor to develop a high-vacuum since the main requirement for detection by nuclear magnetic resonance is simply to collect a sufficiently high number of polarized nuclei within the detector.

The tracer gas, according to a preferred embodiment of the present invention, is a stable isotope of one of the noble gases such as a helium-3 which is stable, i.e. non-radioactive, and has spin of ½ with a nuclear magnetic moment of −2.127. Polarized tracer gas can be detected by applying a strong magnetic field and radio-frequency excitation and measuring the resonant frequency of electromagnetic energy emitted during subsequent relaxation. This frequency is dependent on the spin, the moment, and the applied field, but (to first order) nothing else, thus offering exceptional selectivity.

However, at thermal equilibrium such as a gas has few spin-polarized nuclei, making the detection process rather insensitive. Accordingly in one aspect of the present invention helium-3 is hyper-polarized by combining it with a vapor of polarized metal atoms, such as a vapor of rubidium, Rb, which has been optically polarized with a laser array. In optical polarization of the rubidium, Rb, the atoms are exposed to circularly polarized light at a wavelength of approximately 795 nm. The metal atoms transfer the polarization to the noble gas atoms' nuclei through collisions.

The hyper-polarization of helium gas generates a tracer gas with ten thousand times more atoms which are detectable by the nuclear magnetic resonance detection system of the present invention. This coupled with the lack of naturally occurring helium in the environment makes the detection system of the present invention relatively insensitive to environmental background gases and impurities.

The method and apparatus embodying the present invention combine the usual advantages of using He as a tracer gas with other advantages such as the ease of using an NMR detection system at near-atmospheric pressure. Using helium gas in leak testing enables detection of very low leak rates because the relatively small molecular structure of helium, which allows the gas to pass easily through pores that would block larger molecules of most other air component gases such as oxygen and nitrogen. Additionally, helium is chemically inert so none is present in polymers or plasticizers and no adsorption occurs onto metal or polymers surfaces of the apparatus of the invention.

Another aspect of the present invention is to minimize test cycle time in order to decrease the costs of leak rate testing. Test cycle time is the time to complete a leak detection test of one manufactured article and begin the test of the next article.

In still other aspects of the present invention the leak detection system provides an apparatus and method having reliability of measurement values, sensitivity to small leaks, and insensitivity to temperature variations and environmental gases present either as environmental background or outgassed from the article involved in testing.

Other aspects of the present invention will become obvious to one of ordinary skill in the art upon a perusal of the specification and claims in light of the accompanying drawings.

DETAILED DESCRIPTION OF THE PREFERRED EMBODIMENT

Figure 1:
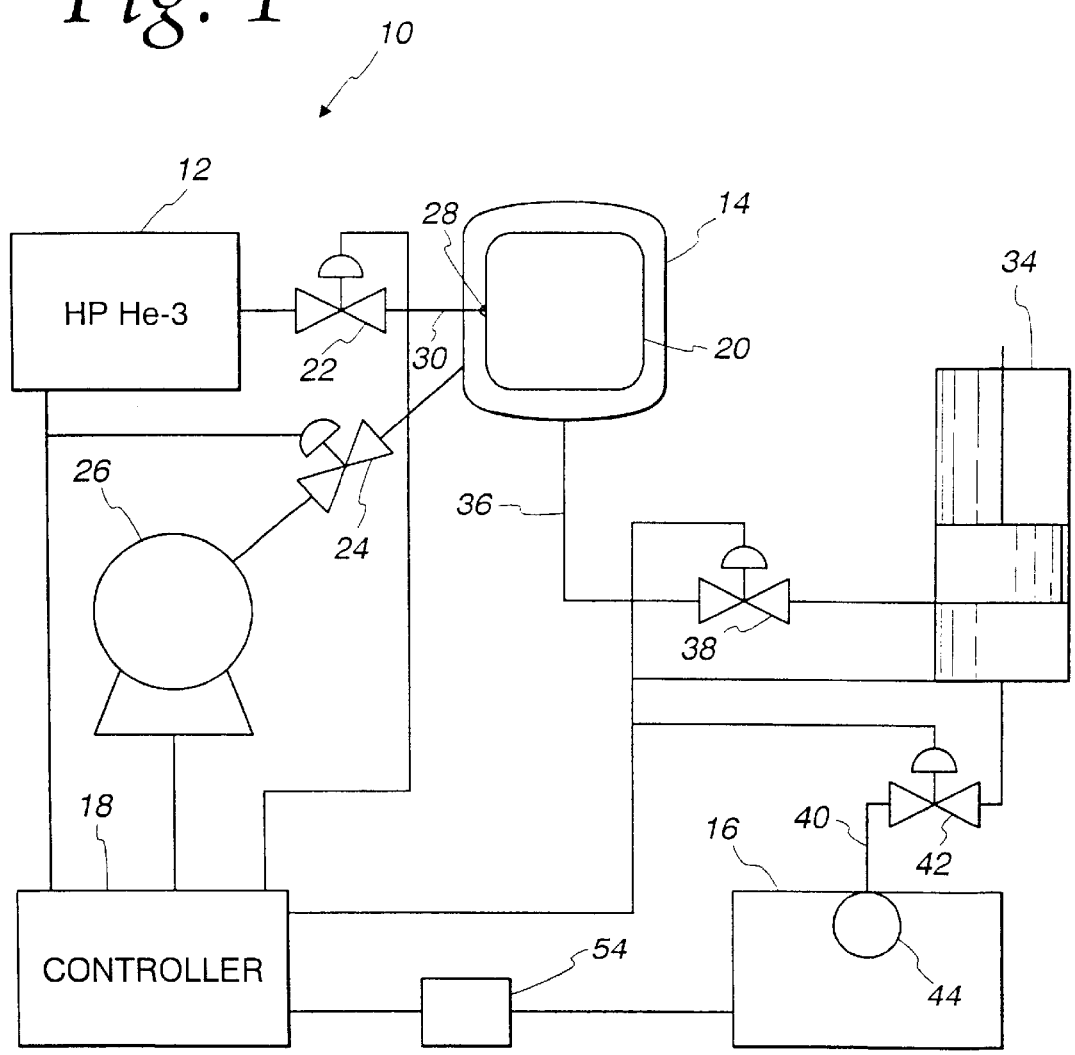
FIG. 1 is a block diagram of an apparatus for measuring a leakage rate of an article and embodying the present invention.

Referring now to the drawings and especially to FIG. 1, a leak detection system embodying the present invention is shown therein and generally identified by reference numeral 10. The leak detection system 10 includes a source of hyper-polarized helium-3 12, a leak test chamber 14, a nuclear magnetic resonance detector 16 and an automated controller 18, such as a suitably programmed personal computer.

The hyper-polarized He-3 gas is useful for leak detection as a type of tracer gas for many reasons. The lower molecular weight of He-3 makes it even better suited than normal He for very small leaks which are due to molecular flow or capillary action. Additionally He-3 occurs naturally in very low concentration so that environmental contamination will have a negligible effect even when measuring extremely low leakage rates.

An article 20 to be tested for leakage is sealed in the leak test chamber 14. Hyper-polarized helium 3 enters the article 20 through an injection port 28 via an injection valve 22 and an injection conduit 30 sufficient to create a concentration of about 1 molecule of tracer in $10^4$ molecules of ambient air. In this embodiment of a pressure differential is established between the interior chamber of article 20 and the free space outside of article 20 within leak test chamber 14. In order to establish this pressure differential prior to testing via the introduction of the gaseous species into test article 20 a rough vacuum pump 26 pumps down the region within the leak test chamber 14 through a rough vacuum valve 24.

Gas which escapes from the article under test 20 into the leak test chamber 14 is collected as part of the testing cycle by a sample transfer system 34 through a conduit 36 and a sample valve 38. The collected gas is pressurized by the sample transfer system 34 thereby concentrating collected gas to make it easier to detect. The gas drawn out by the sample transfer system 34 is compressed,in order to facilitate accurate determination of the concentration of the hyper-polarized He-3 gas. In order to maximize the sensitivity of leak detection it is important to draw as much of the volume gas from the leak test chamber 14 and compress it into as small a volume as possible in the NMR detector 16. The sample transfer system 34 is preferably a piston and a cylinder which can be cycled to compress the gas drawn in. When as much gas as possible has been transferred from leak test chamber 14 into the sample transfer system through a sample valve 38, the sample valve 38 is closed and a transfer valve 42 is opened. The sample of gas containing hyper-polarized gas from the leak test chamber 14 is then transferred through a conduit 40 to an NMR sample chamber 44 of the NMR detector 16. The sample transfer system 34 pressurizes the collected gases from the test chamber 14 so that a greater concentration of gaseous species is actually measured within the NMR sample chamber 44 which makes the apparatus 10 more sensitive to small leaks which at the originally sampled concentration would have been harder to detect reliably.

Figure 2:
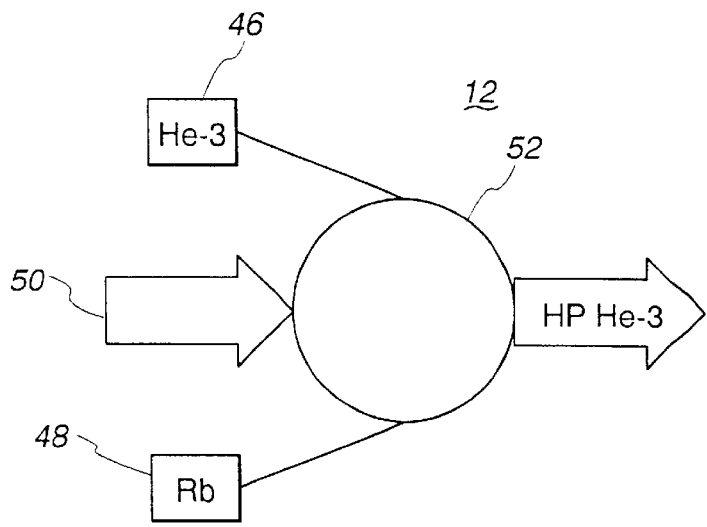
FIG. 2 is a schematic block diagram of a source of hyper-polarized He-3 shown in FIG. 1.

Hyper-polarization by spin exchange optical pumping of noble-gas nuclei is used to make the tracer gas more easily detectable using nuclear magnetic resonant techniques. That is, extremely small amounts of hyper-polarized He-3 can be detected by the NMR detector 16. The hyper-polarized gas is generated by spin transfer from optically polarized Rb metal atoms to the He-3 gas atoms. Hyper-polarized gas source 12, shown in FIG. 2, includes a supply of He-3 46, a rubidium (Rb) metal vapor supply 48, a 795 nm diode laser array 50, and a hyper-polarization chamber 52. A saturated vapor of alkali metal atoms, which in the preferred embodiment are rubidium, and a noble gas, which in the preferred embodiment is He-3, are combined in hyper-polarization chamber 52. The saturated vapor of alkali metal atoms is optically pumped using circularly polarized light from the 795 nm diode laser array 50. The polarization of the Rb atoms is transferred to nuclei of the He-3 atoms via collisions in the hyper-polarization chamber 52.

Figure 3:
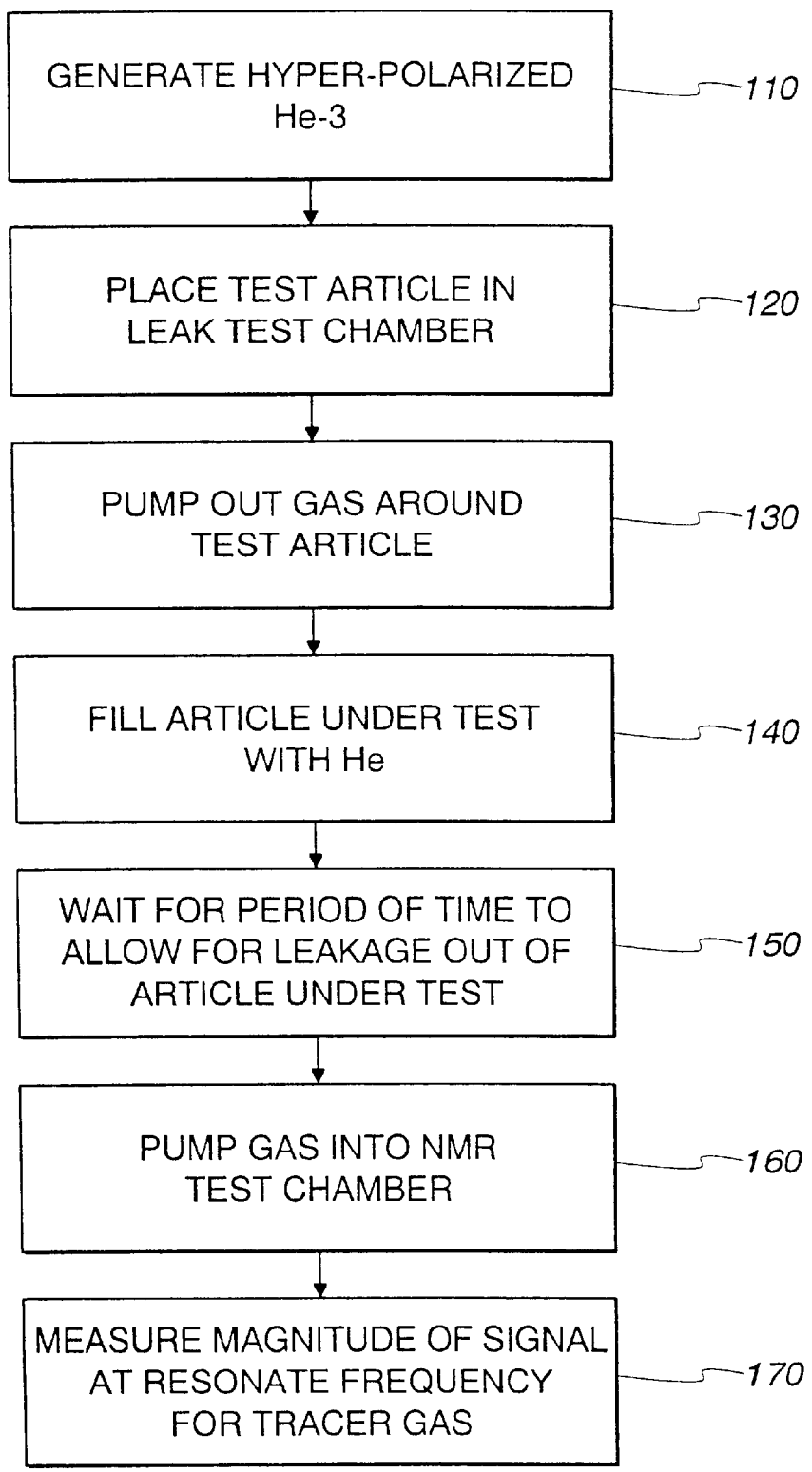
FIG. 3 is a flow chart showing the steps of a method for measuring a leakage rate.

The steps of the method of determining rate of leakage in accordance with the preferred embodiment of the present invention are shown in FIG. 3. The first step in the method of the present invention is to generate hyper-polarized He-3 110. Using spin-exchange optical pumping of noble-gas nuclei a concentration of He-3 with a high nuclear polarization is built up. In hyper-polarization chamber 52 a saturated vapor pressure of alkali-metal atoms is maintained which would be preferably a vapor pressure of $10^{11}$ to $10^{14}$ $cm^{-3}$. In addition to the rubidium and helium, nitrogen, $N_2$, is present in hyper-polarization chamber 52. In the preferred embodiment helium-3, He-3, is used as the noble gas species. However, xenon, Xe, is an alternative gaseous species which may be used.

The pressure of the noble gas, He-3, is in the range of 10 Torr to 10 atmospheres. Temperature is in the range 150–180° C. Circularly polarized light from a laser having a peak energy output of light at approximately 795 nanometers is input into the hyper-polarization chamber 52. After spin exchange interactions between Rb and He-3 atoms the level of polarized He-3 should rise from the thermal equilibrium value of $10^{-5}$ to 0.1 which will increase the nuclear magnetic resonance detection sensitivity $10^4$ times. Potassium may be used in the future as a substitute for rubidium but this would not be practical until shorter wavelength lasers become readily available.

Article 20 is placed in leak test chamber 14, step 120. Test chamber 14 is similar in construction to those that can be used in helium mass spectrometer leakage testing. Chamber 14 is sealed with injection conduit 30 running to injection port 28 of article 20.

With sample valve 38 closed and rough vacuum valve 24 open, rough vacuum pump 26 pumps out the gas surrounding the article under test 20 in a step 130. It is desirable, but difficult in practice, to reduce the clearance volume of the leak test chamber 14 surrounding the article 20 to much less than 10 percent of the overall volume of the leak test chamber 14. In one example of operation of the invention the rough vacuum pump 26 should reduce the pressure in the leak test chamber 14 to about 10 mBar just before testing begins.

At the time testing begins the air in article 20 is injected with the hyper-polarized He-3 gas to achieve a concentration of about $10^{-4}$ while rough vacuum valve 24 is closed, sample valve 38 is open, and transfer valve 42 is closed, step 140. A test time period elapses to allow some of the gas from inside article 20 to escape into the leak test chamber 14 if a leak exists, step 150.

The gas from the leak test chamber 14 is then transferred into the the NMR test chamber, step 160. The sample is transferred by the piston and cylinder sample transfer system 34 which pulls the gas through conduit 36 and sample valve 38 whereupon the sample valve 38 is closed and transfer valve 42 is opened so that captured gas can be then forced into the NMR sample chamber 44.

Pressure applied by the sample transfer system 34 forces the collected gas into a much smaller sample chamber 44 than would otherwise be required. This greatly reduces the size and cost of the permanent magnet, and radio-frequency excitation and search coils, in NMR detector 16. The NMR sample chamber is surrounded by radio-frequency excitation coils, energizable from a suitable source of radio-frequency energy and by a permanent magnet having high, and accurately known, field strength. The NMR control electronics 54 applies to the radio-frequency excitation coils a short burst of radio-frequency excitation energy, tuned precisely to the precession frequency corresponding to the nuclear spin of the tracer gas and the strength of the permanent magnet. That radio-frequency energy is in turn applied to any tracer gas in the NMR sample chamber. Shortly thereafter the control electronics 54 measures the magnitude of any component of the voltage in the search coils having the expected resonant frequency. If such a component is found, its amplitude is processed in order to calculate the number of hyper-polarized He-3 atoms which leaked through test article 20 during the test time period, step 170. The NMR control electronics and controller 18 cooperate to calculate and record the leakage rate.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method of determining a leakage rate for an article comprising:

pressurizing said article with a mixture including some fluid material having a nuclear spin polarization having a value greater than zero;

collecting any of said fluid material escaping from the article under test in a leak sampling region;

applying a magnetic field and radio-frequency excitation to the leak sampling region;

measuring the magnitude of the relaxation resonant frequency for the fluid material; and determining a leakage rate in response to the measured magnitude of the resonant relaxation frequency for the fluid material.

2. A method of determining a leakage rate for an article, according to claim 1 in which the leak sampling region is pressurized with the fluid mixture, and the sample indicating a leak is collected from the interior of the article.

3. A method determining a leakage rate for an article, according to claim 1 in which the nuclear spin polarization of the fluid mixture is increased by using hyper-polarized fluid material.

4. A method of determining a leakage rate for an article, according to claim 2 in which the nuclear spin polarization of the fluid mixture is increased by using hyper-polarized fluid material.

5. A method for measuring a leakage rate through an object into a sample region comprising:

creating a gradient in concentration of a hyper-polarized gaseous species;

detecting a concentration of the hyper-polarized gaseous species in the sample region; and determining the leakage of the object in response to the detected concentration of the hyper-polarized gaseous species.

6. A method for measuring leakage rate through an object into a sample region according to claim 5 wherein detecting the concentration of the hyper-polarized gaseous species includes applying a magnetic field and measuring the strength of the resonant frequency for the hyper-polarized gaseous species.

* * * * *

UNITED STATES PATENT AND TRADEMARK OFFICE
CERTIFICATE OF CORRECTION

PATENT NO.    : 6,626,027 B1
DATED         : September 30, 2003
INVENTOR(S)   : Peter Davey It is certified that error appears in the above-identified patent and that said Letters Patent is hereby corrected as shown below:

<u>Column 6,</u>
Line 47, after "some" insert -- hyper-polarized --
Line 50, change "from" to -- through a leak in --
Line 57, change "determining" to -- calculating --
Line 61, after "which" insert -- an interior of the article --
Line 63, delete "the leak sampling region"
Line 63, change "the interior" to -- an exterior --

Signed and Sealed this

Twenty-seventh Day of July, 2004

JON W. DUDAS
*Acting Director of the United States Patent and Trademark Office*